US007134606B2

(12) United States Patent
Chou

(10) Patent No.: US 7,134,606 B2
(45) **Date of Patent: *Nov. 14, 2006**

(54) IDENTIFIER FOR USE WITH DIGITAL PAPER

(75) Inventor: Henwell Chou, West Hartford, CT (US)

(73) Assignee: KT International, Inc., East Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/074,539

(22) Filed: Mar. 8, 2005

(65) Prior Publication Data

US 2005/0211783 A1 Sep. 29, 2005

Related U.S. Application Data

(63) Continuation-in-part of application No. 10/909,898, filed on Aug. 2, 2004.

(60) Provisional application No. 60/532,540, filed on Dec. 24, 2003.

(51) Int. Cl.
*G06K 19/06* (2006.01)

(52) U.S. Cl. ................................. 235/494; 235/472.03

(58) Field of Classification Search ........ 235/50 R–57, 235/494

See application file for complete search history.

(56) References Cited

U.S. PATENT DOCUMENTS

| | | | | |
|---|---|---|---|---|
| 3,941,976 | A * | 3/1976 | Huhn | 235/54 F |
| 5,377,099 | A | 12/1994 | Miyagawa | |
| 6,243,480 | B1 | 6/2001 | Zhao et al. | |
| 6,738,053 | B1 | 5/2004 | Borgstrom et al. | |
| 6,751,336 | B1 | 6/2004 | Zhao | |
| 6,754,822 | B1 | 6/2004 | Zhao | |
| 6,779,727 | B1 | 8/2004 | Warther | |
| 6,962,450 | B1 * | 11/2005 | Brouhon et al. | 400/76 |
| 2001/0034640 | A1 | 10/2001 | Chaum | |
| 2001/0038383 | A1 * | 11/2001 | Ericson et al. | 345/173 |
| 2001/0042005 | A1 * | 11/2001 | McClure et al. | 705/12 |
| 2001/0055411 | A1 | 12/2001 | Black | |
| 2002/0011989 | A1 * | 1/2002 | Ericson et al. | 345/158 |
| 2002/0042762 | A1 | 4/2002 | McQuade et al. | |
| 2002/0056576 | A1 * | 5/2002 | Ericson | 178/18.01 |
| 2002/0059140 | A1 * | 5/2002 | Fahraeus et al. | 705/40 |
| 2002/0075246 | A1 * | 6/2002 | Zheltukhin | 345/179 |
| 2002/0077885 | A1 | 6/2002 | Karro et al. | |
| 2002/0084325 | A1 | 7/2002 | Reardon | |

(Continued)

FOREIGN PATENT DOCUMENTS

| | | |
|---|---|---|
| EP | 1403777 A2 * | 3/2004 |

(Continued)

*Primary Examiner*—Uyen-Chau N. Le
(74) *Attorney, Agent, or Firm*—McCormick, Paulding & Huber LLP

(57) ABSTRACT

An identification system includes several sheets formed of digital paper each having a unique identifier on a writing surface thereof. Each digital paper may have a form printed on the writing surface. Data representing the form and the location thereof relative to the writing surface is stored in a computer. A digital pen connectable to the computer is compatible with the digital paper for recording pen strokes made by the digital pen and the location of the pen strokes relative to the writing surface. The digital pen includes an ink dispensing tip for marking the writing surface according to the pen strokes. The computer is connectable to the digital pen for retrieving and storing the data representing the pen strokes for each sheet. Upon completion of a form, the computer compares the data representing the pen strokes with the form data and determines the user input to the form.

26 Claims, 7 Drawing Sheets

U.S. PATENT DOCUMENTS

| | | | | |
|---|---|---|---|---|
| 2002/0122568 | A1 | 9/2002 | Zhao | |
| 2002/0128901 | A1 | 9/2002 | Gibbs, Sr. | |
| 2002/0135805 | A1* | 9/2002 | Fahraeus et al. | 358/1.15 |
| 2002/0152094 | A1* | 10/2002 | Fahraeus | 705/1 |
| 2002/0161628 | A1 | 10/2002 | Lane Poor, Jr. et al. | |
| 2002/0198847 | A1* | 12/2002 | Fahraeus | 705/59 |
| 2003/0001020 | A1 | 1/2003 | Kardach | |
| 2003/0006282 | A1 | 1/2003 | Vadura et al. | |
| 2003/0028423 | A1 | 2/2003 | Neff | |
| 2003/0046184 | A1* | 3/2003 | Bjorklund et al. | 705/26 |
| 2003/0062408 | A1* | 4/2003 | Barmettler et al. | 235/51 |
| 2003/0062411 | A1* | 4/2003 | Chung et al. | 235/386 |
| 2003/0106019 | A1 | 6/2003 | Silverbrook et al. | |
| 2003/0106020 | A1 | 6/2003 | Silverbrook et al. | |
| 2003/0173404 | A1* | 9/2003 | Chung et al. | 235/386 |
| 2004/0002926 | A1 | 1/2004 | Coffy et al. | |
| 2004/0016803 | A1 | 1/2004 | Cummings | |
| 2004/0061690 | A1* | 4/2004 | Braun et al. | 345/179 |
| 2004/0061888 | A1* | 4/2004 | Braun et al. | 358/1.15 |
| 2004/0064486 | A1* | 4/2004 | Braun et al. | 707/203 |
| 2004/0064787 | A1 | 4/2004 | Braun et al. | |
| 2004/0091847 | A1 | 5/2004 | Creamer | |
| 2004/0128190 | A1 | 7/2004 | Campo et al. | |
| 2004/0128264 | A1 | 7/2004 | Leung et al. | |
| 2004/0134690 | A1 | 7/2004 | Norris, Jr. et al. | |
| 2004/0135776 | A1 | 7/2004 | Brouhon | |
| 2004/0155115 | A1* | 8/2004 | Lynggaard | 235/494 |
| 2004/0160430 | A1* | 8/2004 | Tokunaga et al. | 345/179 |
| 2004/0169077 | A1 | 9/2004 | Petersen et al. | |
| 2004/0189672 | A1 | 9/2004 | Yamazaki et al. | |
| 2004/0193543 | A1* | 9/2004 | Nord et al. | 705/50 |
| 2004/0259067 | A1* | 12/2004 | Cody et al. | 434/323 |
| 2005/0013104 | A1* | 1/2005 | Feague et al. | 361/683 |
| 2005/0052700 | A1* | 3/2005 | Mackenzie et al. | 358/1.18 |
| 2005/0052706 | A1* | 3/2005 | Nelson | 358/3.28 |
| 2005/0053405 | A1* | 3/2005 | Brouhon et al. | 400/76 |
| 2005/0133596 | A1* | 6/2005 | Mugica et al. | 235/386 |
| 2005/0137948 | A1* | 6/2005 | Kissner et al. | 705/34 |
| 2005/0138541 | A1* | 6/2005 | Euchner et al. | 715/512 |
| 2006/0087497 | A1* | 4/2006 | Borgaonkar et al. | 345/179 |

FOREIGN PATENT DOCUMENTS

| | | | | |
|---|---|---|---|---|
| JP | 07073254 | A | * | 3/1995 |
| WO | WO 2075516 | A1 | * | 9/2002 |
| WO | WO 2075630 | A1 | * | 9/2002 |
| WO | WO/03/042931 | | | 5/2003 |

* cited by examiner

IDENTIFIER FOR USE WITH DIGITAL PAPER

CROSS-REFERENCE TO RELATED APPLICATIONS

This application is a continuation-in-part of U.S. application Ser. No. 10/909,898, filed on Aug. 2, 2004, which claims the benefit of U.S. Provisional Application No. 60/532,540, filed on Dec. 24, 2003, the disclosures of which are herein incorporated by reference in their entireties.

FIELD OF THE INVENTION

The present invention is generally directed to a unique identifier system for use with digital paper, and more particularly relates to an integrated digital paper and electronic document verification and modification process used, for example, with a voting or a patient form input system.

BACKGROUND OF THE INVENTION

There has been a need to develop a system and method to better identify and verify a transaction or other type of event. The event might include, for example, filling out a ballot or other type of document such as, for example, business forms, employment applications, purchase orders, government forms, tax forms, medical forms and documents, laboratory forms, survey forms and school papers.

With respect to ballots, for example, many devices recently have been proposed for casting ballots electronically. For example, U.S. patent application Publication No. U.S. 2003/0173404 A1 published Sep. 18, 2003 discloses a method for reading ballots including reading/imaging each ballot transported on a transport path. Each ballot is read/imaged for orientation indicia, jurisdiction information, and voting selections. The disclosed method requires optically scanning each ballot following the completion of the ballot by a voter.

A voter feedback and receipt system is disclosed in U.S. patent application Publication No. U.S. 2002/0161628 A1 published Oct. 31, 2002. The system includes voter verification of an interpretation of a voter's ballot by a ballot counting device, electronic recording of the verified ballot, and providing a receipt of the verified ballot and votes cast. This system also requires optical scanning of each ballot following completion of the ballot by a voter.

U.S. patent application Publication No. U.S. 2003/0006282 A1 published Jan. 9, 2003 discloses a system and method for electronic voting wherein a voter makes voting selections on a touch screen display. After the voting selections are complete, a voter verifiable paper ballot is printed and an electronic ballot is saved on the system. If the voter is not satisfied with the voting selections reflected on the paper ballot, the paper ballot and the electronic ballot may be discarded and the voter provided a new ballot. This system does not provide a paper ballot that can be utilized in a recount.

Notable disadvantages of the above-identified prior art voting systems are that either an original paper ballot is not used such that there is no original record of the ballots as cast that can be used for a recount, or the system requires optical scanning of each paper ballot and interpreting of the scanned data. The process of scanning each paper ballot cast is a time consuming and expensive step that also inherently includes the possibility of scanning errors which can lead to voter frustration or distrust of the system, especially in close elections.

International patent publication number WO/03/042931 of Lee et al. (hereinafter referred to as "Lee") discloses an apparatus and method for recording and counting votes. The Lee apparatus includes a writing implement having a writing tip, means for electronically sensing the position of the writing tip relative to a datum position, and means for electronically interpreting the position of the writing tip sensed by the sensing means so as to provide an electronic indication of a mark applied to a voting paper with the writing implement during use.

The Lee apparatus and method provides both a paper ballot and an electronic image thereof; however, Lee does not include means for identifying each of the paper ballots. Nothing is provided to identify one paper ballot from another. The apparatus includes means for including a voter identification number with the electronic data recorded from each paper ballot. However, nothing is provided to correlate the original paper ballot with the electronic data received from the digital pen that is recorded from each ballot. Thus, in a recount of the original ballots, there is no way to correlate the recounted totals with the electronically stored images of the ballots and tabulated results.

Based on the foregoing, it is an object of the present invention to provide a verification and identification system that improves upon, or overcomes the problems and drawbacks associated with prior art verification and identification systems. It is also a more general object of the present invention to provide a unique identifier system for use with digital paper in any practical application.

SUMMARY OF THE INVENTION

The present invention provides a digital paper unique identification system and method for use in monitoring a paper trail, such as in an election where candidates are elected in an organized vote for a public office or other such operations where maintaining the unique paper copy is vital or useful. The system provides a computer based program that utilizes original digital papers to be completed by a user. In a preferred embodiment, the digital paper is used in conjunction with a digital pen in communication with the computer system that includes a monitor. As the user completes the form, an electronic image of the form is generated and displayed on the computer monitor in real time or upon docking the pen that makes a connection with the computer. Following completion of the form, the user can view the electronic copy thereof on the monitor and accept the form as completed. Once accepted, the computer system stores the image of the form and the appropriate authorities retain the original paper form to be stored for later verification or modification of the forms if necessary. For example, in the case of a close race in an election, a candidate might request a recount, wherein all or a portion of the hard copies of the original ballots would be compared to corresponding electronic copies generated by the computer. Other examples of modifying an existing form are a doctor adding information onto a patient form, and a salesman adding items to an order form. Using the digital paper unique identifier on these forms, the system can immediately associate the changes with the records stored in the system from the existing forms.

One component of the system is a digital pen such as an Anoto-compliant digital pen that is designed to detect pen strokes when the user writes on a digital form that is compatible with the digital pen. For example, some digital paper includes a plurality of minute dots disposed in a meaningful pattern throughout a writing area of the digital paper. This minute pattern is unique to the digital paper and sections the page into direct coordinates. When a user applies direct pressure to the digital pen against the digital paper, the digital pen will not only mark the paper with ink, but will also read the coordinates of the digital paper and identify where the beginning of the pen stroke is located. As the digital pen moves with this pressure across the digital paper, the digital pen will read the direction and coordinates of the digital pen's path. The stored pen strokes in the digital pen can be transmitted to a computer in real time if the digital pen is connected when writing or when after the writing is complete when the digital pen is connected to the computer using a docking device. An example of this patterned digital paper is Anoto paper.

Another component of the system of the present invention is a form which can be pre-printed on paper with the Anoto pattern. For example, a ballot for use with the system of the invention can be a pre-defined and pre-printed form printed on Anoto compliant digital paper. The ballot allows the voter to make his/her selections directly on the ballot in ink with a digital pen that dispenses ink along the lines of the stroke of the pen.

Since the form is pre-defined, the exact coordinates of the form will match an image of the ballot previously stored in an appropriate database or memory of the computer system. Thus, an electronic copy of the pre-defined ballot is stored in the memory of the computer system to which the digital pen is coupled. The computer is preferably a PC employing Windows Operating System (98, NT, Windows 2000, XP or any future Windows OS) or a Unix Workstation that supports the digital pen and ballot. The computer system can include a hard drive either installed locally or accessible remotely from a server or via the Internet. The computer system can also include a monitor that displays the computer output to the user. The monitor may include a touch screen. The computer system may also include other input devices such as a mouse, keypad, or joystick. Appropriate software is also provided for operating the digital pen, digital paper, and the application system of the present invention.

Paper management is necessary to enforce the validity and operation between the digital data transfer and the paper form. Since the system and method of the present invention enables the data source for the process to be derived from the physical paper wherein each entry can be uniquely traceable to an image representing the exact digital paper form that is stored electronically in the computer, it is apparent that effective management of the printing and distribution of these forms is imperative to the verifying and auditing capabilities.

Another component of the system and method of the present invention includes a function for paper management. The digital paper is printed with patterns which are stored in a database together with information pertinent to the digital paper form, such as location, time, and event. The computer system provides the administrative function to manage the assignment of paper and printing and distribution of all sheets. Therefore, recording the unique identification information, every sheet can be accounted for—what pattern it is printed on. Simultaneously, every printed sheet also has its assigned pattern and associated information stored in the computer system, for example, in a pattern database.

The digital paper includes a uniquely identifiable mark. The identifier is printed as an Anoto-compliant sheet identifier—a unique pattern. When the verification or validation process is required for review, the result stored in the computer memory associated with the present invention can reproduce each and every form that was processed and stored after input. These reproduced forms can be printed out and compared with the physically stored hard copy of the original digital paper form filled out in ink by the user during the input process using the digital and ink pen.

According to the Anoto unique identifier assignment, each page is assigned an address in an IP address-like format. This format follows the algorithm of segment.shelf-.book.page. Assuming that the Segment (referred to as 'C'), Shelf (referred to as 'D'), and Book (referred to as 'E') are all preassigned, the variable number that differs from sheet-to-sheet is the Page (referred to as 'F'). Each page is divided by a grid determined by coordinates into distinct cells. The cells represent a specific number based on the coordinates for the cell, for example from 0 to 255.

In order to create a unique identifier, each physical sheet contains an address which is the combination of cell numbers that are selected from one or more pages in order to create a coded unique identifier. Here we assume we will use four pages ($n_1$, $n_2$, $n_3$, & $n_4$) to create the unique identifier with a combination of four cell numbers. Each cell number corresponds to one distinct cell from each of the four pages ($n_1$, $n_2$, $n_3$, & $n_4$ where $n_1 \neq n_2 \neq n_3 \neq n_4$). The value of $n_x$ is determined by the corresponding values of C, D, E, and F. These cell numbers combine to create a new "address" to uniquely identify and label the sheet.

Step 1: Select sheets to form the base for the unique identifiers. For each page, define each sheet to be either a Segment, Shelf, Book or Page.

Step 2: Select distinct cells from base pages, one cell from each base page. As an example, cell 52 is selected from page $n_1$, 68 from page $n_2$, 135 from page $n_3$ and 63 from page $n_4$.

Step 3: Use these distinct cells to create a pattern on the target page ($n_x$ where $n_1 \neq n_2 \neq n_3 \neq n_4$) in order to identify a sheet.

Step 4: Use these distinct cells to create a pattern in order to identify a sheet.

Prior to writing in the pattern, the user either checks the boxes across the top or draws a single line across the boxes with the digital pen. This allows the system to register the sheet as the unique pen comprised of a defined pattern. When the pen is docked, the system registers the data as referring to that sheet.

Step 1: Register the sheet as the unique address

Step 2: Create data on the pattern

Step 3: Dock the pen

This method of unique identifier creation allows using any number of cell numbers to create the identifier. The cell numbers can be contributed from separated partitions of one or more digital pages. The number of cells and number of pages used in this method can be determined by the number of unique sheets required for the application which is equivalent to the number of ballots required or any application it applies. The address format is not necessarily limited to strictly IP address-like formats.

Furthermore, the method in accordance with the present invention is not limited to Anoto digital papers. This method applies to all digital papers that contain distinguishable patterns on each digital page.

The preferred embodiment of the present invention is enabled using the commercially available Anoto technology. It applies to any future Anoto-like technology that produces digital pens and digital paper that can identify and transmit the exact location of the pen strokes to a PC in real time when the digital pen is connected to the PC or other computer system.

Accordingly, the system of the present invention preferably includes the following:

a. A digital pen readable digital form comprising: a digital form sheet having a unique identifier and printed pattern on digital paper such as an Anoto compliant paper. The digital form has printed information pertaining to the specific form and blank fields for writing using the digital pen. For the example of a voting ballot, the printed pattern on the ballot shows information that includes jurisdiction information, also having a plurality of contest regions thereon, each contest region having two or more mark spaces therein for making voting selections, wherein one of the mark spaces therein represents an abstention selection, wherein the contest regions correspond to contests in the jurisdiction represented by the jurisdiction information, and wherein the representation of jurisdiction information and the mark spaces are readable by an Anoto compliant digital pen.
b. The digital pen readable digital form as described above wherein the identifier includes a unique form identifier, and wherein, for the case of a ballot, the jurisdiction information and the unique ballot identifier may not be related to the identity of any individual voter. For the case of a patient information system, the unique identifier may associate the particular digital form with a patient's name.
c. The digital pen readable digital form as described above wherein a plurality of mark and write-in spaces are provided for entering information.
d. The digital pen readable digital form as described above wherein the digital form is stored when it is filled in by a user using the digital pen. The information is stored in real time either while writing if the digital pen is connected or when the user places the digital pen on a cradle and/or docking device.
e. The digital pen readable digital form input as described above wherein an application uses the unique identifier to ensure the written information is properly stored and processed with the unique identifier.
f. The digital pen readable digital form as described above wherein each digital form can be verified or modified against the information stored in the computer identified using the unique identifier on the digital form.
g. It will also be understood by one skilled in the pertinent art that, in addition to verification, the system and method of the present invention can be used to electronically file any information that is uniquely identified from the collection of a digital form.

In a first aspect of the present invention, a digital paper identification system comprises a processor having a memory coupled thereto. A plurality of sheets is provided. Each sheet includes digital paper having a writing surface and a unique identifier formed thereon. A digital pen is provided for communicating with the processor. The digital pen is compatible with the digital paper for recording pen strokes made by the digital pen and the location thereof relative to the writing surface of the digital paper. The digital pen includes an ink dispensing tip for marking the writing surface of the digital paper according to the pen strokes. The unique identifier includes at least one pattern corresponding to an identifiable cell of a master sheet of the digital paper such that data representing the unique identifier is recordable via the digital pen. The digital pen is for sensing and recording data representing the unique identifier and the pen strokes formed on each of the sheets. The processor is configured for communicating with the digital pen for retrieving from the digital pen the data representing the unique identifier and the pen strokes formed on each of the sheets and including means for storing the unique identifier and the corresponding pen strokes data for each sheet in the memory, and for processing the data representing the pen strokes for each sheet.

In a second aspect of the present invention, a digital paper identification system comprises a processor having a memory and a monitor coupled thereto. A plurality of sheets are provided. Each sheet includes digital paper having a writing surface and a unique identifier formed thereon. Each sheet has a form printed on the writing surface for completion by a user. Form data corresponds to each sheet and represents the form and the location thereof relative to the writing surface being stored in the memory. A digital pen is connectable to the processor. The digital pen is compatible with the digital paper for recording pen strokes made by the digital pen and the location thereof relative to the writing surface of the digital paper. The digital pen includes an ink dispensing tip for marking the writing surface of the paper according to the pen strokes. The unique identifier includes at least one pattern corresponding to an identifiable cell of a master sheet of the digital paper such that data representing the unique identifier is recordable via the digital pen. The digital pen is for sensing and recording the unique identifier and the pen strokes formed on each of the sheets. Means are provided for generating and displaying on the monitor an electronic image of the sheet including the pen strokes created by a user employing the digital pen and retrieved by the processor.

In a third aspect of the present invention, a sheet for receiving written information comprises a sheet of digital paper having a writing surface for being written on by a digital pen. A unique identifier is formed on the sheet of digital paper. The unique identifier includes at least one pattern corresponding to an identifiable cell of a master sheet of the digital paper such that data representing the unique identifier is to be recordable via a digital pen.

The present invention can be implemented in, for example, a computer voting system including a plurality of paper ballots each formed from a sheet of digital paper having a writing surface. A ballot form is printed on the writing surface for completion by a voter during a voting process. Each paper ballot also includes a unique identifier formed on the writing surface. Ballot form data representing the ballot form and the location thereof relative to the writing surface of the digital paper is stored in the memory of the computer.

A digital pen connectable to the computer is also provided. The digital pen is compatible with the digital paper for recording pen strokes made by the digital pen and the location of the pen strokes relative to the writing surface of the digital paper. The digital pen also includes an ink dispensing tip for marking the writing surface of the paper according to the pen strokes.

In a preferred embodiment, the unique identifier includes at least one pattern corresponding to an identifiable cell of a master sheet of the digital paper such that the unique identifier is recordable via the digital pen. The digital pen is for recording data representing the unique identifier and the pen strokes formed on each of the paper forms printed with the digital pattern (the digital paper form). The computer is connectable to the digital pen for retrieving from the digital pen the data representing the unique identifier and the pen strokes formed on each of the digital paper forms and for storing the unique identifier and the corresponding pen strokes data for each digital paper form.

Following the completion or acceptance of a digital paper form, the computer processes the data representing the pen strokes including comparing the pen strokes data with the corresponding digital form definition data and determining the data value from each field on the form. The ink stroke data are processed and then stored along with the pen strokes corresponding to the unique identifier for each digital paper form in accordance with the application logic developed for this digital paper form.

Thus, the present invention provides identifiable electronic data corresponding to each of a plurality of digital paper forms for processing the results of a business process, such as voting, via the computer In a preferred embodiment the present invention utilizes an Anoto®-compliant digital pen or equivalent and Anoto®-compliant digital paper or equivalent that is compatible for use with the digital pen. (Anoto is a registered trademark of Anoto GroupAB of Sweden). The digital pen is connected either wirelessly or wired to a Windows based Personal Computer (PC) or UNIX based workstation or other computer system. Alternatively, a docking station can be used for connecting the digital pen to the computer.

As used herein, the terms digital pen and digital paper are used to describe known devices that cooperate to provide electronic data representative of pen strokes and the location thereof relative to the digital paper such that the pen strokes are reproducible by a computer in communication with at least one of the digital pen and digital paper.

Accordingly, one object of the present invention is to provide a digital paper form input system that each digital paper form can be uniquely identified.

Another advantage and object of the present invention is to use the uniquely identifiable cells on the digital paper form to provide specific functions. One example is to use a specific unique cell for the white-out function. In this example, after the white-out cell is marked by the digital pen, the subsequent action is to block an area for preventing the ink strokes in that area from being processed by the computer application.

Other advantages and objects of the present invention that will be apparent or obvious from the detailed description or illustrations contained herein are within the scope of the present invention.

DETAILED DESCRIPTION OF THE PREFERRED EMBODIMENTS

The present invention resides in a system for uniquely identifying sheets of digital paper that are written or otherwise marked upon with a digital pen. The present invention is especially useful in distinguishing such sheets of digital paper where the digital papers have identical digital patterns with respect to each other except for a unique identifier associated with each sheet to be explained more fully below. The present invention can be used in any application where it is useful to identify and distinguish sheets of digital paper. Digital paper having a unique identifier can include, for example, ballots, forms, applications, or surveys to be marked by users. The present invention will now be explained by way of example with respect to digital paper with a unique identifier serving as a ballot in an electronic voting system. However, it should be understood that the digital paper having a unique identifier is not limited in this regard, but can be used in various other applications, as briefly mentioned above, without departing from the scope of the present invention.

Figure 1:
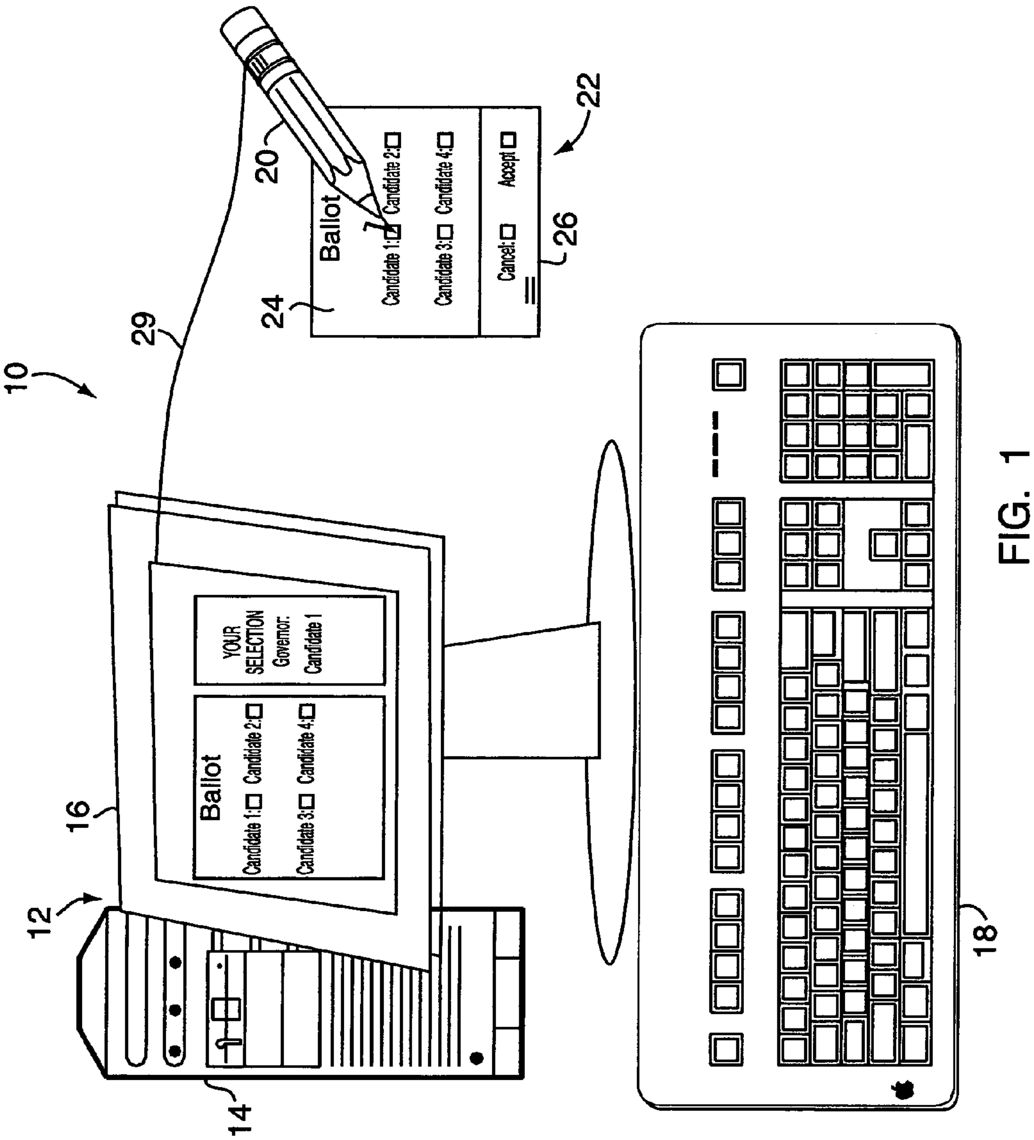
FIG. 1 is a schematic view of one embodiment of a voting system according to the present invention.

As shown in FIG. 1, a voting system in accordance with the present invention is generally designated by the reference number 10. The voting system 10 comprises a computer 12. The computer 12 includes a processor 14, a monitor 16 and a keyboard 18. A digital pen 20 is connected to the processor 14 via a wire 29. In other embodiments the digital pen 20 can be wireless or dockable with the computer 12 using a docking station (not shown). The voting system 10 also comprises a paper ballot 22 that includes a writing surface 24 formed of digital paper 26.

The computer 12 is preferably a personal computer (PC) employing Windows Operating System (98, NT, Windows 2000, XP or any future Windows OS) or a Unix Workstation that supports the digital pen 20 and the digital paper 26. The computer 12 can include a hard drive either installed locally or accessible remotely from a server or the Internet. The monitor 16 displays the computer output to a user and may include a touch screen for inputting information to the processor 14. The computer 12 may also include other input devices such as a mouse, keypad, or joystick. Appropriate software is also provided for operating the digital pen 20, digital paper 26, and the voting system 10 of the present invention.

Figure 2A:
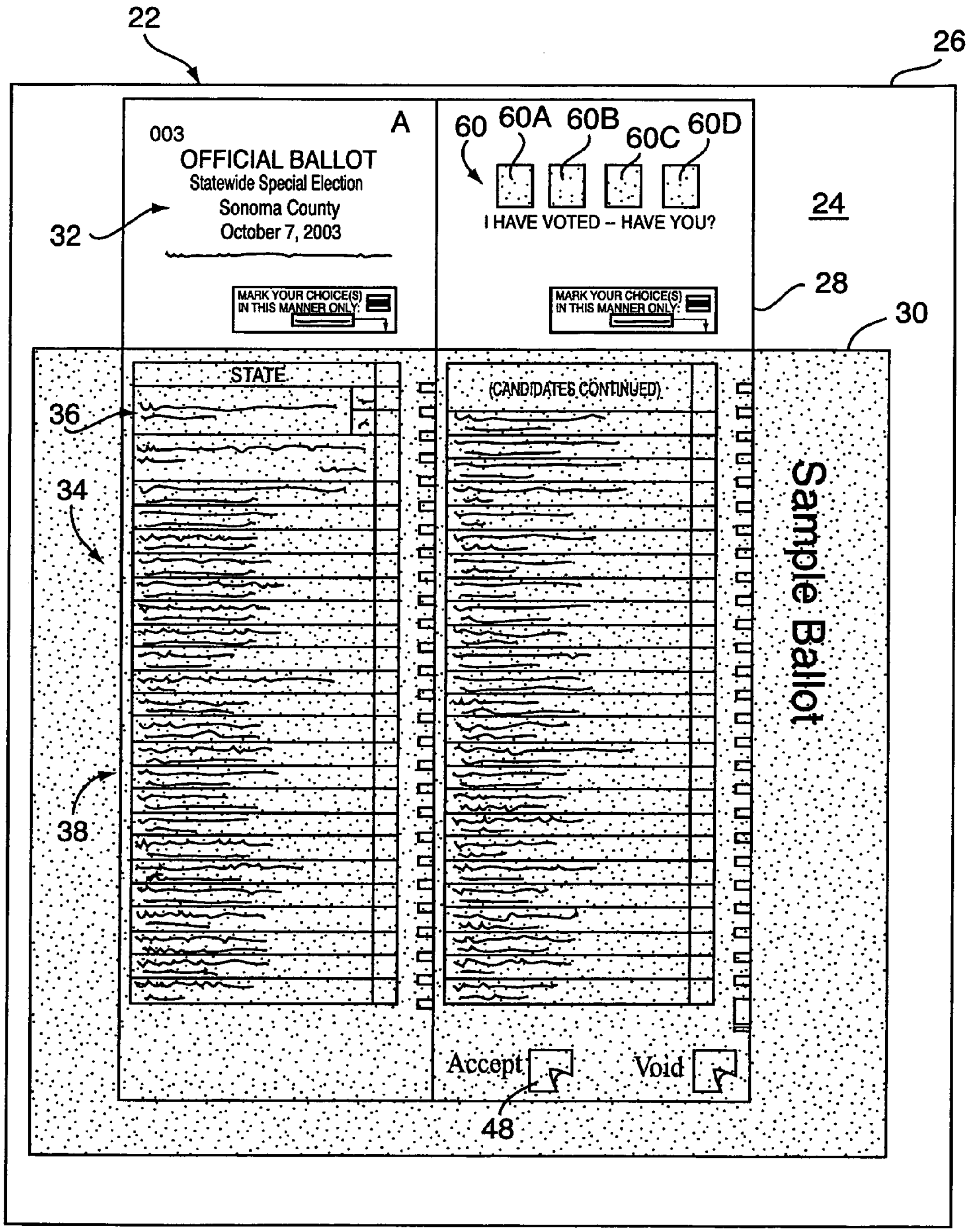
FIG. 2A illustrates a paper ballot according to the present invention having a unique identifier formed on the writing surface thereof.

Referring to FIG. 2A, the paper ballot 22 having a unique identifier according to the present invention includes a ballot form 28 printed on the writing surface 24 that is formed of the digital paper 26. In a preferred embodiment, the voting system 10 utilizes Anoto® digital paper which is a product of Anoto AB of Sweden. However, other types of digital paper can be substituted without departing from the scope of the present invention.

Figure 2B:
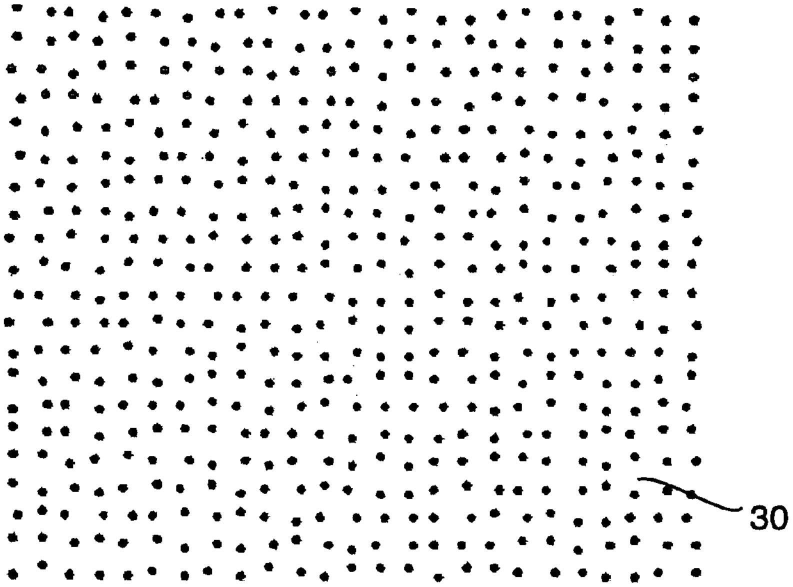
FIG. 2B is an enlarged view of a portion of a typical dot pattern reproduced from a sheet of Anoto® digital paper.
Figure 3:
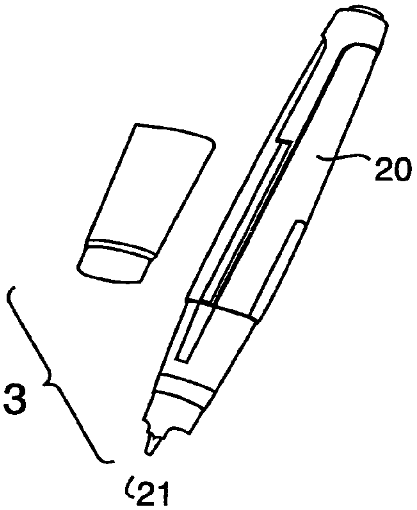
FIG. 3 is a perspective view of a digital pen and cap for use in the voting system of the present invention.

Referring to FIG. 2B, the digital paper 26 includes a plurality of small or minute dots disposed in a pre-defined dot pattern 30 throughout the writing surface 24 of the digital paper. The dot pattern 30 defines coordinates throughout the entire writing surface 24 which are pre-stored in a memory of the computer 12. FIG. 2B shows an enlarged view of a typical portion of a dot pattern 30 reproduced from a sheet of Anoto® digital paper. As shown in FIG. 3, when a user applies direct pressure to the digital pen 20 against the digital paper 26, the digital pen marks the writing surface 24 with ink as does an ordinary ink pen and also senses and thereby records the dot pattern 30 of the digital paper 26 at the location of the pen strokes. Accordingly, data representing both the pen strokes and the exact location of the pen strokes relative to the writing surface 24 are recorded and stored in the digital pen 20.

In the preferred embodiment, a tiny camera in the digital pen 20 registers the digital pen's movement across the dot pattern 30 of the writing surface 24 and stores the pen stroke as series of map coordinates. The map coordinates correspond to exact locations of the writing surface 24 that are pre-stored in a memory of the computer 12 and associated with a serial number or identifier corresponding to a sheet of the digital paper 26. As the digital pen 20 moves with a writing pressure across the digital paper 26, the digital pen senses the dot patterns 30 and thereby records the direction and coordinates of the pen strokes. The pen strokes recorded by and stored in the digital pen 20 can be transmitted to the computer 12 in real time if the digital pen is coupled to the computer while creating the pen strokes. In the FIG. 1 embodiment, the digital pen 20 is coupled to the computer 12 via a cable 29 such that pen strokes created by the digital pen 20 and the dot pattern 30 providing the coordinates of the pen strokes relative to the digital paper 26 are transmitted to the computer 12. The digital pen 20 can be configured for wireless communication with the computer 12 in real time. A wireless digital pen 20 is shown in FIG. 3.

In other embodiments of the voting system 10, a digital pen 20 is configured to communicate with the computer 12 via a docking device (not shown) following the completion of a series of pen strokes. For example, upon completion of the paper ballot 22, or a plurality of paper ballots, a digital pen 20 can be placed in a conventional docking device that is connected to the computer 12 and configured to transmit data corresponding to the stored pen strokes and the corresponding map coordinates on the digital paper 26 to the computer 12.

Referring again to FIG. 2A, the voting system 10 provides a paper ballot 22 that includes a writing surface 24 formed of digital paper 26 as described above. The paper ballot 22 allows a voter to cast his/her vote by marking or filling out the paper ballot 22 using the digital pen 20 just as a typical ballot is marked with an ordinary pen thereby creating an original of the completed paper ballot 22. The paper ballot 22 of FIG. 2A includes a ballot form 28 including election information 32 and a voting area generally indicated by the reference numeral 34. The voting area 34, for example, includes a YES or NO question 36 and a candidate selection area 38. To cast his/her vote, a voter marks the ballot in the appropriate boxes adjacent to his/her selections using the digital pen 20. To mark the paper ballot 22, the voter uses a pen stroke that provides a mark on the paper ballot via a writing tip 21. During the pen stroke, the digital pen 20 records the pen stroke and the location of the pen stroke relative to the paper ballot 22 via the dot pattern 30 on the digital paper 26.

The paper ballot 22 including the ballot form 28 imprinted on the digital paper 26 is pre-defined. Therefore the exact coordinates of the ballot form 28 will match an image of the paper ballot previously stored in an appropriate database or memory of the computer 12. Thus, data representing an electronic image of the paper ballot 22 is stored in the memory of the computer 12 and can be reproduced and displayed on the monitor 16 or output via a printer. Each paper ballot 22 can be uniquely identified using a unique identifiable mark. Providing a unique identifier on each paper ballot 22 is discussed further hereinafter.

Upon acceptance of the uniquely identified paper ballot 22 by a voter using the unique identifier 60 in accordance with the present invention, the computer 12 can store the image of the ballot 42 as well as the time and date the vote was cast. The voting system 10 can, upon acceptance of the paper ballot 22 by the voter, add the voter's vote(s) as cast to a running total thereby tallying the votes during the voting process.

Thus, identified using the unique identifier 60, the voting system 10 provides an original paper ballot 22 as well as the capability to reproduce an exact duplicate thereof using the stored pen strokes obtained by the digital pen 20 and an electronic copy of the ballot form 28 anytime after the ballot 34 has been cast by the voter. Accordingly, the computer 12 can be used to reproduce an electronic image of each paper ballot 22 completed by a voter as well as process data representing the image of each paper ballot 22 as completed. Thus, the computer 12 in accordance with the voting system 10 includes software for processing the data representing the completed paper ballots 22 to tally the votes cast, to monitor the voting process and the results thereof, or for other purpose related to a voting process. Each of the uniquely identified paper ballots 22 once completed by a voter can be retained to verify the results of a voting process if necessary. Therefore, the voting system 10 provides a verifiable voting input system and method of use thereof for voting processes.

The paper ballot 22 includes a printed unique identifier 60. When a verification or validation process is required for the review of an election or voting process, the voting results tabulated by and/or stored in the memory of the computer 12 of the voting system 10 and retrievable based on the unique identifier can be reproduced in the form of an electronic image of the paper ballot or a hard copy thereof. Thus, each and every paper ballot 22 that was completed, processed and stored during an actual voting process is reproducible for verifying the results of an election or voting process. These reproduced images or hard copies of the paper ballots 22 can be compared with the physically stored original paper ballots 22 filled out in ink by the voter during the voting process using the digital pen 20. Accordingly, using an electronic image or hard copy of the original paper ballot 22, the system and method of the present invention eliminates the possibility for any undetectable alteration of the computer record during the verification process. Additionally, the identifiable one-to-one relationship between the original paper ballots 22 and the reproducible electronic image or hard copy thereof promotes voter confidence in the integrity of the voting system.

Figure 11:
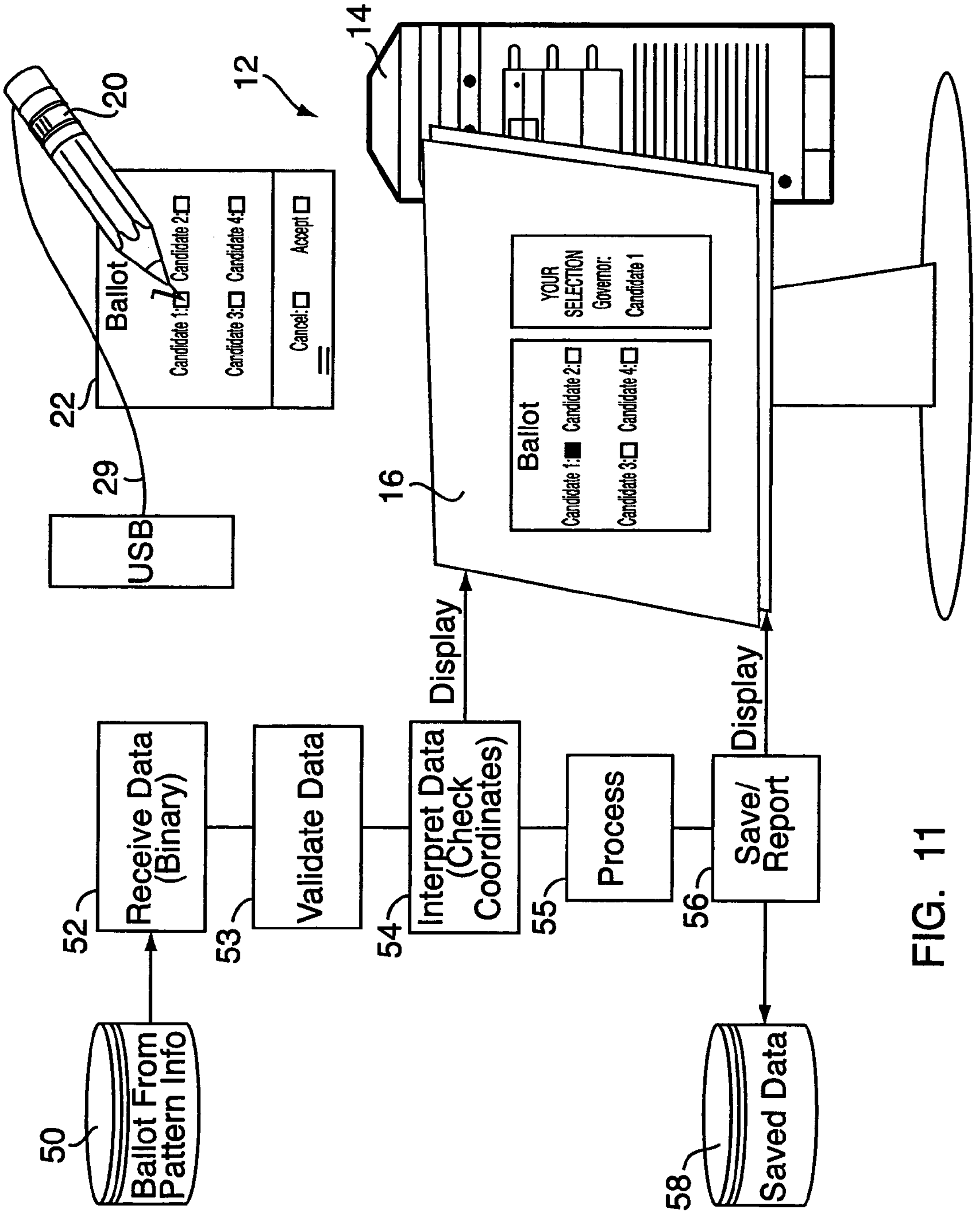
FIG. 11 is a diagram of an overview of the back end process of a voting system in accordance with the present invention.

One embodiment of the voting system 10 is illustrated in a flowchart of FIG. 11 and includes a ballot form/pattern database 50 wherein ballot form data corresponding to each paper ballot 22 including the ballot form 28, the dot pattern 30 contained thereon, and other information related to the paper ballot is stored in a memory of the computer 12. Typically, the ballot form data is stored based on a ballot unique identifier. The ballot form data can be stored according to the unique identifier and represents a particular paper ballot having a unique identifier provided thereon.

When a ballot is cast, ballot data including a ballot unique identifier transmitted from the digital pen 20 is received by the computer 12 at block 52. At block 53, the ballot unique identifier is used to retrieve the ballot form data from the ballot form/pattern database 50 and confirm or authenticate the ballot identifier. The ballot data is then compared to the dot pattern 30 retrieved from the ballot form/pattern database 50 and processed at blocks 54 and 55 for confirming the location of any voter selections relative to the ballot form 28 and processing the selections which may include tallying the ballot data with respect to a vote count. The ballot data and results thereof are stored and a report generated at block 56. A completed ballot database 58 is provided to store the ballot data retrieved from the digital pen 20 for each paper ballot 22 completed as well as data representing the image of each completed paper ballot and the election results derived therefrom.

Figure 6:
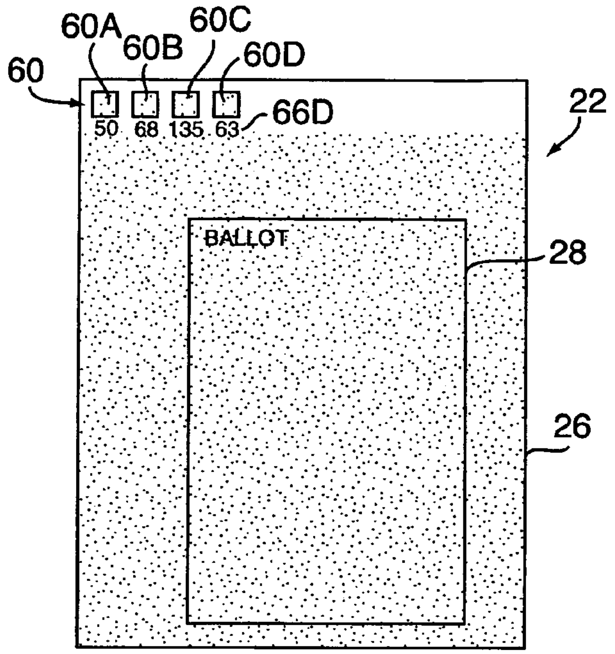
FIG. 6 is an example of a blank sheet of digital paper having a unique identifier in accordance with the present invention.

Referring to FIG. 6, in one embodiment of the voting system 10, a unique identifier, generally designated with the reference number 60 is assigned to and reproduced on each paper ballot 22. The unique identifier 60 includes at least one pattern corresponding to an identifiable cell 62 of a master sheet of the digital paper 26 such that the unique identifier 60 is recordable via the digital pen 20. Typically, the unique identifier 60 is recorded during a voting process for identifying the paper ballot 22 and the ballot data received from the digital pen 20 during or after the voting process and associated with the completed paper ballot.

Figure 8:
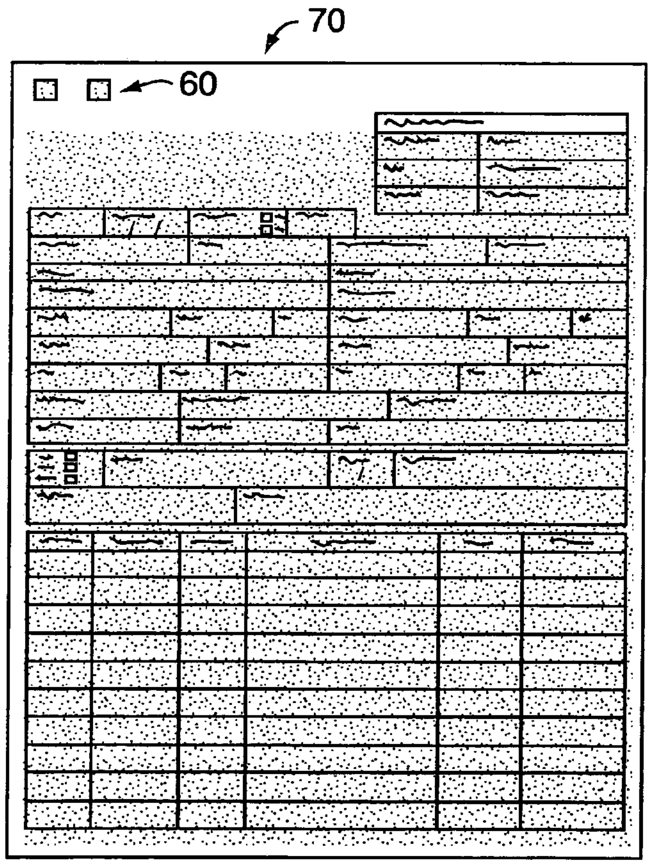
FIG. 8 is an example of a postcard digital paper order form that has a unique identifier in accordance with the present invention.

Accordingly, the unique identifier 60 renders each sheet of the digital paper 26 identifiable by the computer 12 via the digital pen 20. As described herein with respect to the ballots and voting system of the present invention, the unique identifier is used to identify each of a plurality of ballots used in a voting process. However, the unique identifier for use with digital paper in accordance with the present invention is not limited in this regard. The unique identifier for use with digital paper disclosed herein can also be used in other applications where it is necessary or desirable to identify a document created using a digital pen and digital paper. For example, as shown in FIG. 8, a merchant order formed of digital paper 70 and used by a retail store could include a pad of multiple sheets of digital paper each having a unique identifier 60 designated for or assignable to a specific order request to the present invention that is detectable and recordable via a digital pen. Using the unique identifier 60, the retailer can always modify the original order by writing on the order form 70 referencing the original unique identifier. Thus, each written order includes a unique identifier that can be recorded and stored along with data retrieved from the digital pen that represents the actual pen strokes the retailer created when writing the order form for the designated customer. Accordingly, the actual order information including any merchant description and quantities are recorded and stored with respect to the unique identifier detected and recorded via the digital pen at the time the order is written.

Figure 9:
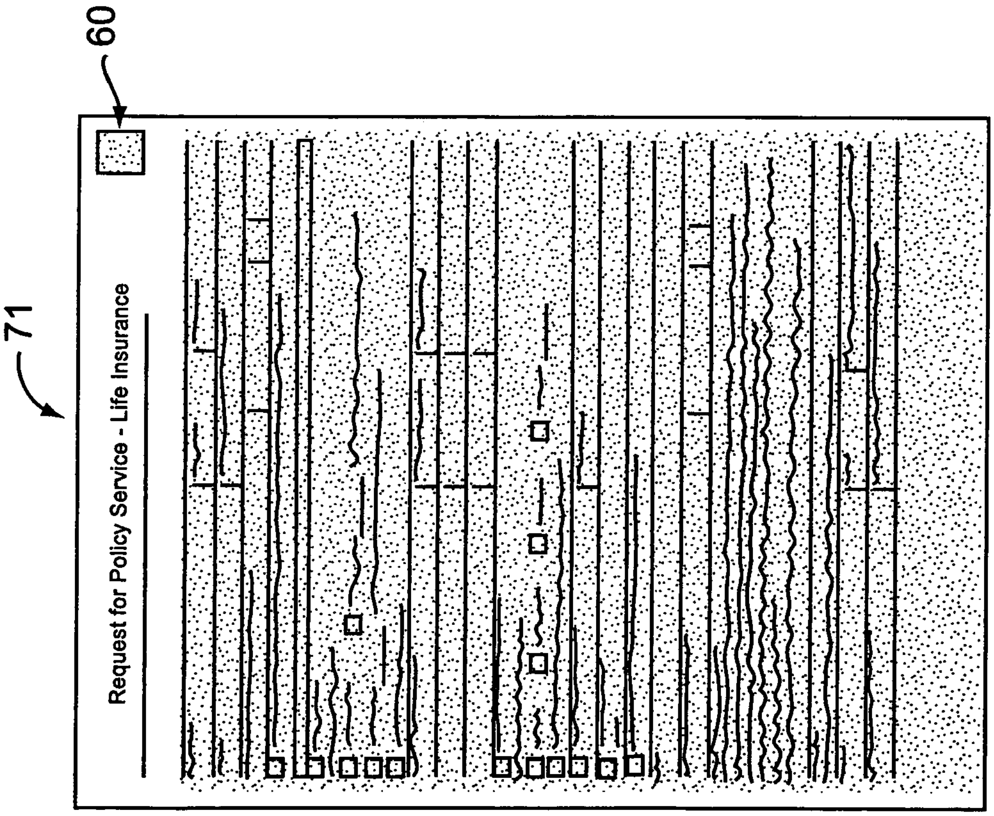
FIG. 9 is an example of a postcard digital paper used as a life insurance policy service form that has a unique identifier in accordance with the present invention.

As another example, as shown in FIG. 9, a Request for Policy Service—Life Insurance Form formed of digital paper 71 and used by a life insurance policy carrier could include a pad of multiple sheets of digital paper each having a unique identifier 60 designated for or assignable to a specific service request to the present invention that is detectable and recordable via a digital pen. Using the unique identifier 60, the insurance company can always modify the original order by writing on the order form 71 referencing the original unique identifier. Thus, each written service request includes a unique identifier that can be recorded and stored along with data retrieved from the digital pen that represents the actual pen strokes the insurance company created when writing the request form for the designated policy holder. Accordingly, the actual order information including any service requests are recorded and stored with respect to the unique identifier detected and recorded via the digital pen at the time the order is written.

Figure 10:
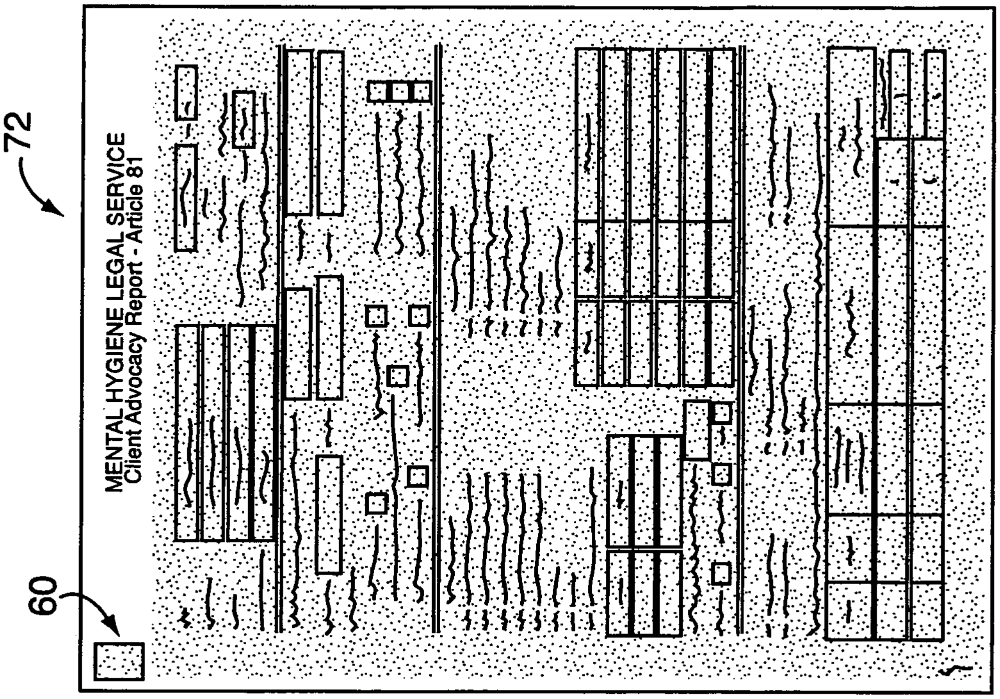
FIG. 10 is an example of a postcard digital paper used as a mental hygiene legal service form that has a unique identifier in accordance with the present invention.

For example, as shown in FIG. 10, a Mental Hygiene Legal Service Report formed of digital paper 72 and used by an attorney from a state agency could include a pad of multiple sheets of digital paper each having a unique identifier 60 designated for or assignable to a specific report to the present invention that is detectable and recordable via a digital pen. Using the unique identifier 60, the attorney can always retrieve or modify the original report by writing on the order form 72 referencing the original unique identifier 60. Thus, each written report includes a unique identifier 60 that can be recorded and stored along with data retrieved from the digital pen that represents the actual pen strokes the attorney created when writing the report form for the designated mental patient. Accordingly, the actual report information including any services rendered are recorded and stored with respect to the unique identifier detected and recorded via the digital pen at the time the report is written. Thus, the unique identifier of the present invention that is detectable and recordable via the digital pen provides an efficient and accurate method of identifying and storing documents created on digital paper using a digital pen.

Additionally, the unique identifier can be used in the processing, editing or reporting of documents or for other purposes. Other examples of documents wherein the unique identifier for use with digital paper in accordance with the present invention can be used are business forms, employment applications, purchase orders, government forms, tax forms, medical forms and documents, laboratory forms, survey forms and school papers. Accordingly, one skilled in the pertinent art will recognize that the voting ballots described herein and the order form, service request form and service report form mentioned above are just several examples of the various applications of the unique identifier for use with digital paper in accordance with the present invention.

Additionally, one skilled in the pertinent art will recognize that the unique identifier for use with digital paper in accordance with the present invention increases the usefulness of a single sheet of digital paper. For example, a single sheet of digital paper 26 having a unique identifier 60 can be easily reproduced n times (where n is thousands, hundreds of thousands, millions, or greater) such that each of the sheets of digital paper has a writing surface with the same dot pattern 30. A unique identifier 60 according to the present invention determined using a plurality of identifiable cells of the dot pattern 30 of the same or a different sheet of digital paper 26 can then be imprinted on each of the sheets, providing a unique identifier on each and every one of the n sheets of digital paper. Thus, the unique identifier 60 renders each of the n sheets unique and identifiable via the digital pen 60 and the computer 12. In sum, the unique identifier for use with digital paper in accordance with the present invention can be utilized to identify any number of sheets of digital paper having the same or different dot patterns 30 as will be discussed further hereinafter.

Figure 4:
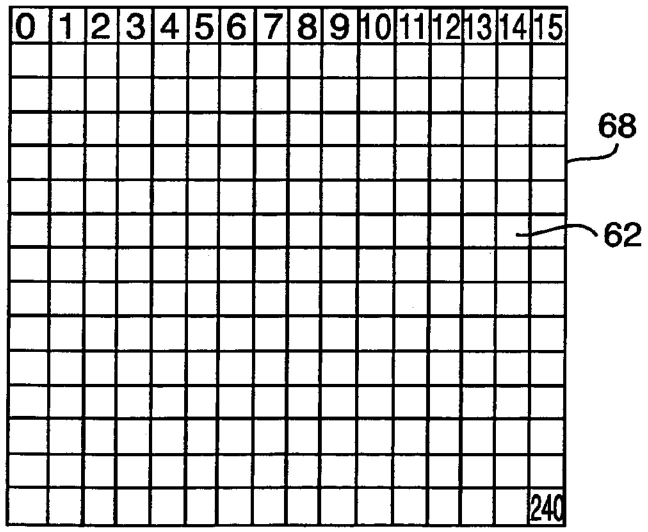
FIG. 4 is a diagram of one embodiment of a grid as used with a master sheet of digital paper for establishing unique identifiers for a plurality of paper ballots in accordance with the present invention.
Figure 5:
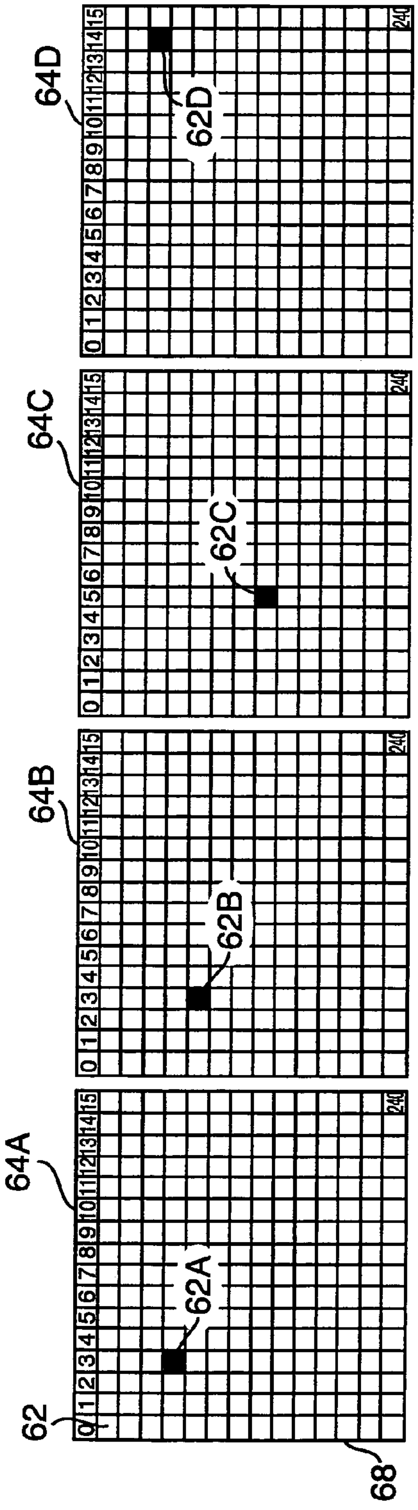
FIG. 5 is a diagram showing a series of four ordered master sheets of digital paper as used to establish unique identifiers for a plurality of paper ballots in accordance with the present invention.

As shown in FIGS. 5 and 6, the unique identifier 60 includes an ordered series of patterns 60A, 60B, 60C, and 60D that each correspond to the pattern contained in an identifiable cell 62 of an ordered series of master sheets 64A, 64B, 64C, and 64D of digital paper 26 used to assign a unique identifier 60 to each of a plurality of paper ballots 22. To establish the unique identifier 60 for each paper ballot 22, unique identifier cells (60A, 60B, 60C and 60D) are printed on the digital paper with the ballot 22. In the illustrated embodiment, the unique identifier number 60 includes a series of cell numbers 60A, 60B, 60C and 60D that identify a series of cells 62A, 62B, 62C and 62D respectively, one from each of the ordered series of master sheets 64A–64D. In the illustrated embodiment, each of the cells 62A–62D are established using a grid 68, as shown in FIG. 4, oriented in a predetermined position relative to the dot pattern 30 of the master sheets 64A–64D of digital paper. As shown in FIGS. 5 and 6, the grid 68 divides the dot pattern 30 of each of the master sheets 64A–64D into 240 cells. Thus, when using four master sheets 64A–64D, the number of possible unique identifier numbers 60 is approximately equal to $240^4$ or 3,317,760,000. More or fewer master sheets 64 can be used depending on the desired number of paper ballots 22 each having a unique identifier 60 associated therewith. Additionally, two or more cells 62 could be identified in each of the master sheets 64, increasing the number of unique identifiers 60 available.

Referring again to FIGS. 5 and 6, the unique identifier number 60 selected for the illustrated ballot 22 is 52.68.135.63. Thus the cell number 60A has a value of (52 of sheet 64A) and corresponds to the cell 52 of master sheet 64A; cell number 60B has a value of (68 of sheet 64B) and corresponds to the cell 68 of master sheet 64B; cell number 60C has a value of (135 of sheet 64C) and corresponds to the cell 135 of master sheet 64C; and cell number 60D has a value of (63 of sheet 64D) and corresponds to the cell 63 of master sheet 64D. The unique identifier numbers 60 including each of the cell numbers 60A–60D for each paper ballot 22 can be automatically selected in numerical order or randomly selected from the number of cells of the grid 68. For example, if the unique identifier numbers 60 are selected in numerical order, a first paper ballot 22 could have a unique identifier number of 0.0.0.0. Typically, a software application is utilized for determining the unique identifier numbers 60 for the paper ballots 22.

The unique identifier 60 including the ordered series of patterns 60A–60D corresponding to the cells 62A–62D of the master sheets 64A–64D is reproduced and printed on the paper ballot 22 as shown in FIG. 2A.

Figure 7A:
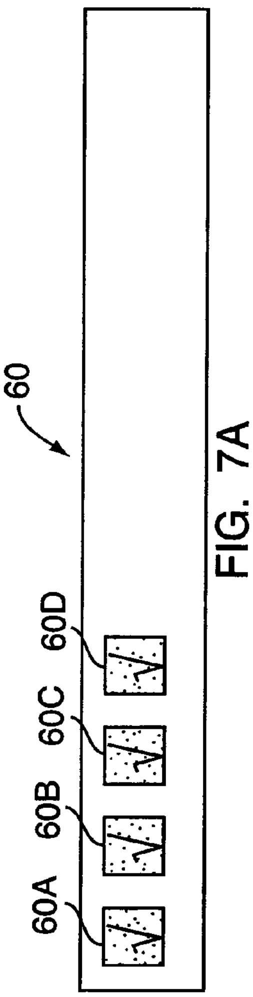
FIGS. 7A and 7B illustrate the unique identifier of the digital sheet of FIG. 6 shown marked for registering a paper ballot in accordance with the present invention.
Figure 7B:
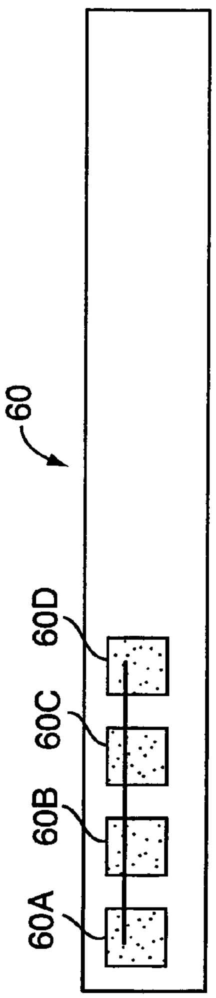

As used, each paper ballot 22 containing a unique identifier 60 can be initialized by a voter using the digital pen 20. As shown in FIGS. 7A and 7B, by marking each of the series of patterns 60A–60D of the unique identifier 60 using the digital pen 20, each of the patterns 60A–60D is recorded by the digital pen 20 and data representing the patterns 60A–60D is transmitted to the computer processor 12. The data representing the patterns 60A–60D is transmitted to the computer 12 during or after a voting process as discussed above and typically following voter acceptance of a completed paper ballot 22. The computer 12 stores the ballot data corresponding to each paper ballot 22 using the unique identifier number 60 derived from the data representing the patterns 60A–60D. Thus, each of the paper ballots 22 include a unique identifier 60 that can be used to identify the paper ballot 22 as well as the stored ballot data that represents the voter selections on the paper ballot.

The unique identifier 60 provided on each of the paper ballots 22 can also be used to monitor a voting process either during or after the completion of the voting process. The paper ballots 22 can be distributed in certain geographic locations, and the unique identifiers 60 can be utilized to sample or review ballot selections by the computer 12 based on geographic or other criteria.

Another feature of the present invention voting system 10 includes a function for ballot management. The paper ballots 22 are printed on digital paper 26, the dot patterns 30 of which are stored in a ballot database 50 (FIG. 11) together with the corresponding ballot form data representing the ballot form 28 and information such as jurisdictions, contest regions and polling locations. The voting system 10 provides an administrative function to manage the assignment of the paper ballots 22 and the printing and distribution thereof. Therefore, every paper ballot 22 can be accounted for—including the ballot form 28 that is printed on each paper ballot 22, the polling location, and where any vote count or tallies will be delivered.

The computer 12 processes the data received from the digital pen 20 including comparing the received data with the ballot form data retrieved from a database 50 and determines the voter selections and votes cast therefrom. The voter selections are stored in the computer 12 along with the electronic image of the paper ballot 22 and the unique identifier 60. Thus, the electronic image 22 and the voter selections for each paper ballot 22 can be retrieved and reviewed using the unique identifier 60. Accordingly, a recount of a portion of the paper ballots 22 can be compared with the data stored in the computer 12 related to the recounted paper ballots 22.

The preferred embodiment of the present invention is enabled using the commercially available Anoto® technology. It applies to any future Anoto® or similar technology that produces digital pens and digital paper that can identify and transmit the exact location of the pen strokes to a PC in real time when the digital pen is connected to the PC or other computer system.

Following is a summary of one embodiment of the method steps of a voting process using the voting system 10 of the present invention:

A plurality of paper ballots 22 are pre-printed on digital paper with a ballot form 28 and unique identifiers 60 and distributed to a plurality of polling locations for a given jurisdiction. Ballot form data representing the ballot form 28, the dot pattern associated with the digital paper 26 as well the location of the ballot form with respect to the dot pattern are stored in the memory of the computer 12 along with the unique identifier for each paper ballot. The paper ballots 22 allocated and distributed to each polling location are identified using the unique identifiers 60 and are also stored in the computer 12.

Typically, on the day of voting, after a voter is checked in and verified using a proper identification compared against a voter registration record, a voting administrator picks out a paper ballot 22 from the paper ballots 22 allocated to the particular polling location. The voting administrator then records the associated unique identifier 60 on the selected paper ballot 22 by marking the unique identifier on the paper ballot using a digital pen 20. The paper ballot 22 is thereby initialized by the voting system 10 and ready to be cast. Alternatively, the voter can initialize the paper ballot 22 by marking the unique identifier 60 with the digital pen 20.

The voting administrator hands the initialized paper ballot 22 to the voter.

The voter fills in a voter selection area 34 of the paper ballot 22 by marking the paper ballot 22 using the digital pen 20.

The actual votes are entered into the computer 12 in real time in one of the following ways:

No additional action by the voter if the digital pen 20 is connected to the computer 12 at all times during the voting process;

When the voter places the digital pen 20 onto a pen docking device connected to the computer 12;

When the voter accepts the ballot by checking the box 48 on the paper ballot.

The vote is cast and recorded when the voter accepts the result by marking an accept box 48 on the paper ballot 22 using the digital pen 20. Upon acceptance of the paper ballot 22, the exact date/time is recorded for the paper ballot 22 along with the unique identifier 60 therefor.

The paper ballot 22 is then sealed and stored physically for any future reference which may be necessary or requested.

Through the unique identifier 60, the paper ballot 22 and the corresponding computer record are associated in a one-to-one relationship. The computer record includes data corresponding to electronic representation of the completed paper ballot 22.

The computer 12 processes the data received from the digital pen including comparing the pen strokes and the location thereof with the ballot form data information retrieved from the ballot/form database 50 and determines the voter selections therefrom. The voter selections or votes from each ballot 22 are tabulated and stored and can be added to a running total for each candidate or issue presented on the paper ballot 22.

The foregoing description of embodiments of the invention has been presented for the purpose of illustration and description. It is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated.

What is claimed is:

1. A digital paper identification system comprising:

a processor having a memory coupled thereto;

a plurality of sheets, each sheet including digital paper of the same or different digital pattern relative to each other, and having a writing surface and a unique identifier formed thereon, the writing surface including a predefined pattern extending throughout the writing surface defining coordinates on the writing surface which are prestored in the memory;

the unique identifier being separate and distinct from the predefined pattern extending throughout the writing surface, the unique identifier including a pattern corresponding to at least one identifiable cell of the predefined pattern formed on a specific sheet of the digital paper such that each sheet is identifiable one from the other;

a digital pen for communicating with the processor, the digital pen including an ink dispensing tip for marking the writing surface of the digital paper and a camera for capturing images of the markings corresponding to pen strokes made by the digital pen and the predefined pattern on the writing surface associated with the location of the markings, the unique identifier being markable by the digital pen for providing data to identify the marked sheet;

the processor configured for communicating with the digital pen and retrieving from the digital pen the data representing the captured images including the predefined pattern on the writing surface and the pen strokes formed on each of the sheets and including means for storing the data representing the unique identifier and the corresponding pen strokes data for each sheet in the memory, and for processing the data representing the pen strokes for each sheet.

2. The system according to claim 1 further comprising a monitor coupled to the processor and configured to display an electronic image of the sheet.

3. The system according to claim 2 wherein the processor is configured for generating and displaying on the monitor an electronic image of the sheet in real time while the sheet is being marked upon.

4. A digital paper identification system comprising:

a processor having a memory and a monitor coupled thereto;

a plurality of sheets, each sheet including digital paper of the same or different digital pattern relative to each other, and having a writing surface and a unique identifier formed thereon for distinguishing each of the sheets from among the plurality of sheets, each sheet having a form printed on the writing surface for completion by a user;

the writing surface including a predefined pattern extending throughout the writing surface defining coordinates on the writing surface which are prestored in the memory;

the unique identifier being separate and distinct from the predefined pattern extending throughout the writing surface, the unique identifier including a pattern corresponding to at least one identifiable cell of the predefined pattern formed on a specific sheet of the digital paper such that each of the sheets is identifiable one from the other;

form data corresponding to each sheet and representing the form and a location thereof relative to the writing surface being stored in the memory;

a digital pen connectable to the processor, the digital pen including an ink dispensing tip for marking the writing surface of the paper and a camera for capturing images of the markings corresponding to pen strokes made by the digital pen and the predefined pattern on the writing surface associated with the location of the markings, the unique identifier being markable by the digital pen for providing data identify the marked sheet;

means for generating and displaying on the monitor an electronic image of the sheet including the pen strokes created by a user employing the digital pen and retrieved by the processor.

5. The system according to claim 4 wherein the processor is configured to store data representing the electronic image of each sheet in accordance with the unique identifier associated with the sheet.

6. The system according to claim 4 wherein the digital paper includes a plurality of dots disposed in a pre-defined pattern throughout the writing surface thereof.

7. The system according to claim 4 further comprising means for selecting the identifiable cell of the master sheet from a plurality of cells each having a different pattern relative to each other.

8. The system according to claim 7 wherein the means for selecting the identifiable cell includes randomly selecting the identifiable cell of the master sheet.

9. The system according to claim 7 wherein the unique identifier is associated with a cell number corresponding to the identifiable cell of the master sheet.

10. The system according to claim 4 wherein the unique identifier includes at least one pattern corresponding to an identifiable cell of each of an ordered series of master sheets of the digital paper.

11. The system according to claim 4 wherein the processor is configured for determining user selections marked on one of the sheets while the sheet is being marked upon, and for comparing the pen strokes and the location thereof recorded by the digital pen with the form data corresponding to the sheet.

12. The system according to claim 4 wherein each of the sheets includes a form pre-printed on the digital paper including at least one of a unique identifier.

13. The system according to claim 4 wherein each sheet defines an accept area on the writing surface where a user can indicate acceptance of a completed form by marking the accept area using the digital pen.

14. The system according to claim 13 wherein the processor is configured to record and store data representing an image of a completed form along with the time and date of the acceptance thereof and the unique identifier associated with the completed form.

15. The system according to claim 4 wherein the processor is configured to generate and display at least one of an electronic image of the sheet and a verification screen identifying user written ink strokes on the sheet.

16. A sheet for receiving written information, comprising:

a sheet of digital paper having a writing surface for being written on by a digital pen, the writing surface including a predefined pattern extending throughout the writing surface defining coordinates on the writing surface;

a unique identifier cell printed on the sheet of digital paper configured for distinguishing from among sheets of digital predefined pattern extending throughout the writing surface defining coordinates on the writing surface;

a unique identifier formed on the sheet of the digital paper configured for distinguishing from among sheets of digital paper having the same or different digital pattern relative to each other; and the unique identifier being separate and distinct from the predefined pattern extending throughout the writing surface, the unique identifier including at least one pattern corresponding to an identifiable cell of the predefined pattern formed on a specific sheet of the digital paper such that data representing the unique identifier is recordable via a digital pen for identifying the sheet of the digital paper.

17. The sheet according to claim 16 wherein the pattern associated with the unique identifier is comparable to a pattern associated with the specific sheet of digital paper.

18. The sheet according to claim 16 wherein the unique identifier comprises a series of patterns each corresponding to identifiable cells of a master sheet of digital paper.

19. The sheet according to claim 16 wherein the unique identifier is imprinted on the sheet of digital paper.

20. A sheet for receiving written information, comprising:

a sheet of digital paper having a writing surface for being written on by a digital pen, the writing surface including a predefined pattern extending throughout the writing surface defining coordinates on the writing surface;

a unique identifier cell printed on the sheet of digital paper configured for distinguishing from among sheets of digital paper having the same or different digital pattern relative to each other; and the unique identifier cell being separate and distinct from the predefined pattern extending throughout the writing surface, the unique identifier cell including at least one pattern corresponding to an identifiable cell of a master sheet of the digital paper such that data representing the unique identifier cell is recordable via a digital pen for identifying the sheet of digital paper.

21. The sheet according to claim 20 wherein the pattern associated with the unique identifier cell is comparable to a pattern associated with the master sheet of digital paper.

22. The sheet according to claim 20 wherein the unique identifier cell comprises a series of patterns each corresponding to identifiable cells of the master sheet of digital paper.

23. The sheet according to claim 20 wherein the unique identifier cell is imprinted on the sheet of digital paper.

24. The sheet according to claim 20 wherein the unique identifier cell is associated with a command on processing of ink stroke data on the digital paper.

25. The sheet according to claim 24 wherein the command is to delete an ink stroke for a predetermined area on the digital paper as marked by the digital pen.

26. The sheet according to claim 24 wherein the command is to resume accepting ink strokes on the digital paper.

* * * * *

UNITED STATES PATENT AND TRADEMARK OFFICE

CERTIFICATE OF CORRECTION

PATENT NO. : 7,134,606 B2

APPLICATION NO. : 11/074539

DATED : November 14, 2006

INVENTOR(S) : Henwell Chou

It is certified that error appears in the above-identified patent and that said Letters Patent is hereby corrected as shown below:

Column 17, Claim 16, lines 32-36, please delete the paragraph "a unique identifier cell printed on the sheet of digital paper configured for distinguishing from among sheets of digital predefined pattern throughout the writing surface defining coordinates on the writing surface".

Signed and Sealed this

Twentieth Day of February, 2007

JON W. DUDAS

*Director of the United States Patent and Trademark Office*